UNITED STATES PATENT OFFICE.

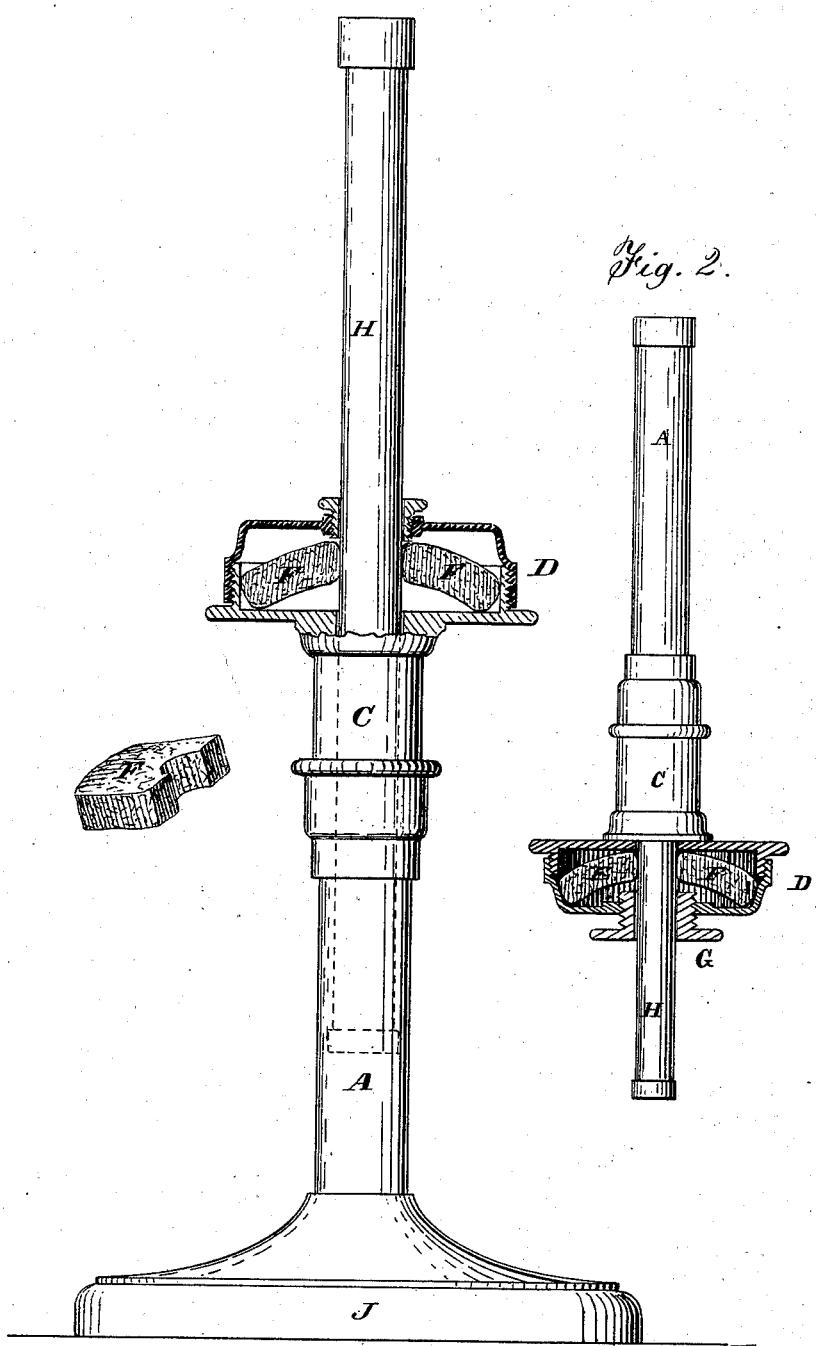

JOHN McHENRY, OF CINCINNATI, OHIO.

IMPROVEMENT IN BRAKES FOR EXTENSIBLE GAS-FIXTURES.

Specification forming part of Letters Patent No. 216,282, dated June 10, 1879; application filed February 25, 1879.

*To all whom it may concern:*

Be it known that I, JOHN McHENRY, of Cincinnati, Hamilton county, Ohio, have invented a new and useful Brake for Extensible Gas-Fixtures and Drop-Lights, of which the following is a specification.

My invention relates to a new and useful self-acting brake for the extensible rod or member of gas-fixtures and lamps, whether of the pendent or of the standard varieties.

In place of balls, metallic wedges, or springs for brakes, I employ two or more flat pieces of india-rubber, so placed in a suitable confining box or case that their outer edges bear against the walls of the case, and their inner or inclined edges press firmly against the sliding member with sufficient force to prevent any unassisted depression.

In the accompanying drawings, Figure 1 shows my brake applied to the extensible stem of a stand-lamp. Fig. 2 represents the same applied to a pendent or drop-light extension.

A may represent the joint whereby the stationary part B is made fast to the service-pipe or base, as the case may be. C may represent any suitable stuffing-box, preferably one not requiring oil or grease—such, for example, as that patented to me on the 30th of May, 1876, and numbered 178,177. D is a box, case, or abutment for the support and retention in the represented obliquely-inclined position of two or more slabs, plates, or flat pieces of rubber, F F, whose outer edges bear against the sides and lower end of the box, and whose inner and inclined edges press against the sliding rod or pipe H, so as to oppose any downward motion of that member and of its attached or depending burners, &c., but to offer no resistance to any elevation of that member.

The stationary member being placed downward and provided with a foot or base, J, as in Fig. 1, and being surmounted by a suitable box, D, the extensible member H is elevated by being drawn out from the stationary member, as in Fig. 1. On the contrary, when employed in a drop-light, such member in being elevated is pushed into the stationary member. When not employed for gas, the member H may be a solid rod and the stuffing-box be dispensed with.

I am aware that packing-rings have been applied to extensible rods for chandeliers for the purpose of securing gas-tight joints, and such I do not claim.

In my device the rubber slabs F are capable of compression horizontally and of vertical movement at their inner edge, which movement is suitably limited in both directions by the walls of the casing or box.

I am also aware that a patent has been granted for a chandelier in which the extension-rod is of square form, and has a surrounding brake-box, to the interior of which two ends of a pair of helical springs are attached, the other ends of said springs carrying binding-plates conforming in shape to that of the square rod, and having segmental lugs on each side to extend over the tube or rod. The faces of these plates are designed to be covered with leather, chamois, or similar material. This device, it will be readily seen, is more complicated and liable to get out of order than where simply a slab of rubber is used, which latter arrangement dispenses with the use of metal for the brake force and for the gripe for embracing the rod. I also dispense with the necessity for covering the bearing-surfaces with leather or similar material. My rubber slabs F, while fulfilling all the requirements fulfilled by the spiral springs and leather-covered binding-plates, can be produced at much less cost, are not so liable to get out of order, and can be more readily replaced or duplicated by any unskilled person than can the aforesaid comparatively cumbersome and expensive device.

I claim as new and of my invention—

1. In the described combination with the extensible rod or pipe H of a gas or other illuminating fixture, the india-rubber slabs or plates F F, supported within a box or case, D, secured to the stationary portion, substantially as set forth.

2. As a new article of manufacture, the stuffing-box C, having the attached or appended brake-box D, supporting the rubbers F F, the whole being combined and adapted to operate with the sliding tube or rod of an extension gas or lamp fixture, substantially as set forth.

In testimony of which invention I hereunto set my hand.

JOHN McHENRY.

Attest:
  GEO. H. KNIGHT,
  L. H. BOND.